United States Patent [19]
Onose et al.

[11] Patent Number: 5,107,307
[45] Date of Patent: Apr. 21, 1992

[54] SEMICONDUCTOR DEVICE FOR CONTROL OF LIGHT

[75] Inventors: Hidekatsu Onose; Michio Ohue, both of Hitachi; Masayoshi Naito, Kodaira, all of Japan

[73] Assignee: Hitachi, Ltd., Tokyo, Japan

[21] Appl. No.: 742,523

[22] Filed: Aug. 7, 1991

Related U.S. Application Data

[63] Continuation of Ser. No. 250,112, Sep. 28, 1988, abandoned.

[30] Foreign Application Priority Data

Sep. 30, 1987 [JP] Japan .................................. 62-243820

[51] Int. Cl.⁵ .................................. H01L 27/12
[52] U.S. Cl. .................................. 357/4; 357/16; 357/30; 357/45; 357/17
[58] Field of Search .................. 372/45; 357/4 SL, 4, 357/30, 17, 30 E, 16

[56] References Cited

U.S. PATENT DOCUMENTS

| | | | |
|---|---|---|---|
| 4,620,214 | 10/1986 | Margalit et al. | 357/63 |
| 4,716,449 | 12/1987 | Miller | 357/4 SL |
| 4,755,860 | 7/1988 | Allam | 357/4 SL |
| 4,819,036 | 4/1989 | Kuroda et al. | 357/30 E |

FOREIGN PATENT DOCUMENTS

84-03397 8/1984 PCT Int'l Appl. .

*Primary Examiner*—Andrew J. James
*Assistant Examiner*—Courtney A. Bowers
*Attorney, Agent, or Firm*—Antonelli, Terry, Stout & Kraus

[57] ABSTRACT

A semiconductor optical modulator is provided wherein very thin films of two kinds of semiconductors having different band gaps are laminated alternately to form a multi-quantum well (MQW) structure, also called a super-lattice structure, and current is injected into the MQW structure to change the corresponding optical absorption and refractive index characteristic thereof so that a sufficient on/off ratio can be obtained.

33 Claims, 5 Drawing Sheets

SEMICONDUCTOR DEVICE FOR CONTROL OF LIGHT

This application is a continuation of application Ser. No. 07/250,112, filed on Sept. 28, 1988 now abandoned.

BACKGROUND OF THE INVENTION

This invention relates to optical modulators or semiconductor devices for control of light which are operable optically bistably and, more particularly, to the structure of an optical device suitable for modulation of light in an information terminal equipment such as an optical head.

As described in WO 84/03397, in a conventional semiconductor optical modulator, very thin films of two kinds of semiconductors having different band gaps are alternately laminated to form a multi-quantum well (MQW) structure (also called a super lattice structure) which is used as an intrinsic region of a PIN semiconductor structure, and voltage is applied to the intrinsic region so that the absorption peak of excitons confined within the MQW structure may be shifted under the influence of Stark effect to thereby modulate the intensity of transmission light. Thus, the prior art optical modulator is of a so-called voltage (electric field) application type and voltage is applied in inverse bias fashion so as to ensure effective application of voltage (electric field) to the MQW structure.

The above prior art can afford to modulate light at high speeds; however, it fails to fully take into account the on/off ratio, thus raising a problem that when applied to information terminal equipment such as an optical head, it would be difficult for the prior art optical modulator to provide both a sufficient on/off ratio and sufficient intensity of transmission light.

SUMMARY OF THE INVENTION

An object of this invention is to provide a semiconductor optical modulator which can provide a sufficient on/off ratio and sufficient intensity of transmission light.

According to the invention, to accomplish the above object, a plurality of very thin semiconductor films having different compositions are alternately laminated to form a MQW structure, each film having a thickness which causes the exciton confinement effect to take place and causes energy at the absorption peak of excitons to coincide with energy of light to be controlled, and current injected into the MQW structure by biasing it in the forward direction is on/off controlled.

In order to further increase the transmission factor during on-state, the MQW structure may be so interposed between two layers as to come into intimate contact therewith, the two layers being made of a material which has a band gap wider than that of the MQW structure, and the product of thickness and refractive index of the material may be made to be odd times as large as ¼ of the wavelength of light to be controlled.

In order to further increase the on/off ratio, the MQW structure may be interposed between two mirrors to form a Fabry-Pérot resonator.

Figure 2:
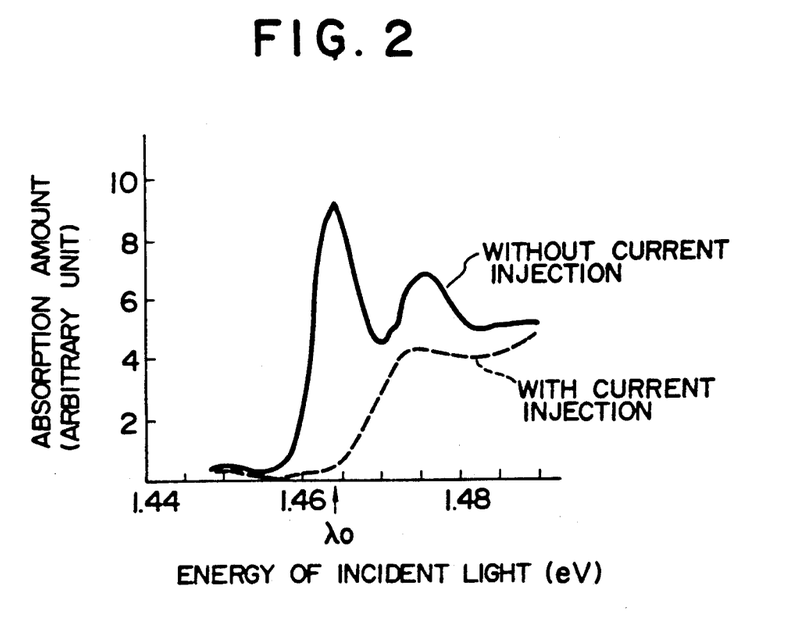
FIG. 2 is a graph showing the relation between energy of light incident to the device and absorption amount.

FIG. 2 graphically illustrates how change of the absorption coefficient depends on current injection. Without current injection (solid line), the absorption peak of excitons confined within the MQW structure clearly exists (le - hh, le - lh). Normally, the existence of excitons in the MQW structure is due to the fact that an electron and a positive hole are coupled together by coulomb force to take the form of a hydrogen-atom-like structure. However, when current is injected into the MQW structure, an injected carrier penetrates between electron and hole to intercept the coulomb force (screening effect) with the result that the excitons collapse and energy absorption by excitons disappears (dotted line). Consequently, most of light is not absorbed in process of transmission. Since the absorption coefficient during on-state is minimal, the thickness of the MQW structure can be large to minimize transmission factor during off-state. In this manner, the optical modulation according to this invention is based on a different principle from that of the prior art optical modulator so as to provide a large transmission factor during on-state and a large on/off ratio.

A second problem in optical modulation is reflection. When a semiconductor device comprised of the MQW structure and a current injector is in contact with a material having a wider band gap than that of the MQW structure (e.g. the band gap being larger than energy of light to be controlled) (see FIG. 1), reflection takes place at the surface of the material and at the interface between the material and the MQW structure. By making the product of thickness and refractive index of the material odd times as large as ¼ of a wavelength of light to be controlled, the phases of surface reflection light and interface reflection light can be inverted to each other and resultant intensity of the two reflections can be minimized. Further, thanks to the band gap being larger than energy of light to be controlled, no absorption takes place in the material. It therefore follows that the reflection can be minimized and the transmission factor during on-state can be further increased.

DESCRIPTION OF THE PREFERRED EMBODIMENTS

The invention will now be described by way of example with reference to FIGS. 1 to 9.

Figure 1:
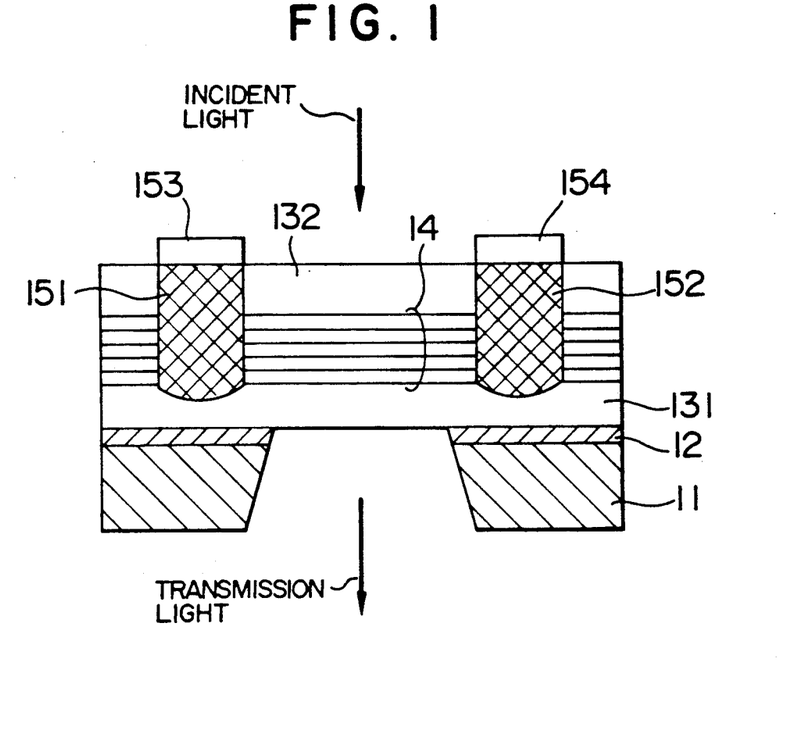
FIG. 1 is a schematic sectional view illustrating a device according to a first embodiment of the invention.

Firstly, referring to FIG. 1, a semiconductor device for control of light according to a first embodiment of the invention comprises an n-type <100> substrate 11 of GaAs doped with Si, an n-type buffer layer 12 of GaAs having a film thickness of 0.5 μm, i-type layers 131 and 132 of AlGaAs each having a film thickness of 309 nm and a MQW structure 14 of n-type GaAs/AlGaAs. These layers and MQW structure are prepared through molecular beam epitaxy process. The Al content of the AlGaAs layer is 0.28. Generally, when the Al content is x a composition of $Al_xGa_{1-x}As$ is referred to herein. The MQW structure includes 100 GaAs layers (having each a film thickness of 9.5 nm) and 100 AlGaAs layers (having each a film thickness of 9.8 nm) which are laminated alternately to have a total film thickness of 1.93 $\mu m$. Subsequently, the substrate and GaAs buffer layer are etched to form a hole of 175 $\mu m$ diameter Be and Si are implanted to form a p+-type electrode contact 151 and an n+-type electrode contact 152, respectively. An electrode 153 comprised of a 30 nm thick Cr layer and a 1 $\mu m$ thick Au layer is prepared through vapor deposition. Similarly, an electrode 154 comprised of a 30 nm thick Au layer and a 1 $\mu m$ thick Au-Ge-Ni layer is prepared through vapor deposition.

Figure 3:
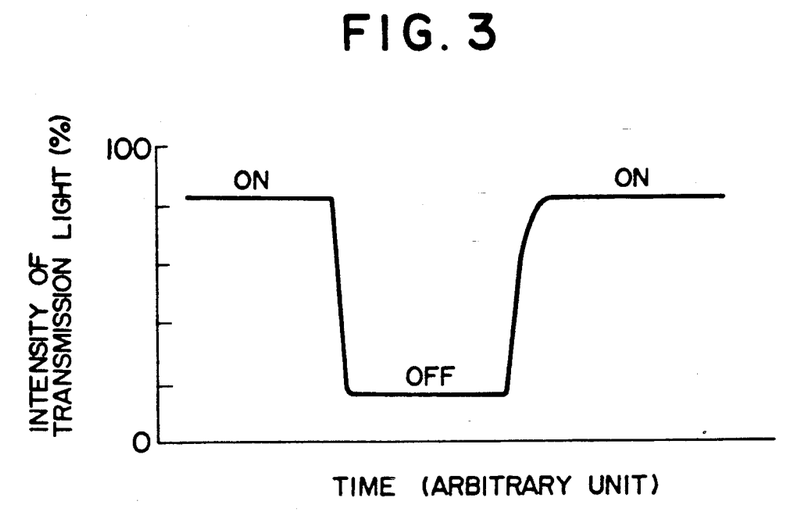
FIG. 3 is a graph showing an on/off ratio for transmission factor in the device.

Referring to FIG. 2, the operation of the device will be described. In FIG. 2, solid line represents the light absorption amount obtained when no current is injected and dotted line represents the light absorption amount obtained when current is injected. A current density of about 10 $A/cm^2$ is used for measurement. Turning to FIG. 3, the time chart shows how change of the intensity of transmission light depends on on/off state of current injection. The wavelength of incident light used in FIG. 3 is $\lambda_0$ indicated in FIG. 2. As is clear from FIG. 3, the transmissivity during on-state is large amounting to 83% and the on/off ratio has a large value which is about 4.7:1. In this embodiment, the film thickness of the i-type AlGaAs layer 131 or 132 is 5/4 . n times $\lambda_0$, when n is refractive index of the i-type AlGaAs layer, measuring 3.42 and $\lambda_0$ measures about 847 nm.

Preferably, the current injector for injection of current into the MQW layer may be made of a material having a wider band gap than that of the MQW layer. The band gap of $Al_xGa_{1-x}As$ can be increased by increasing the content x.

Figure 4:
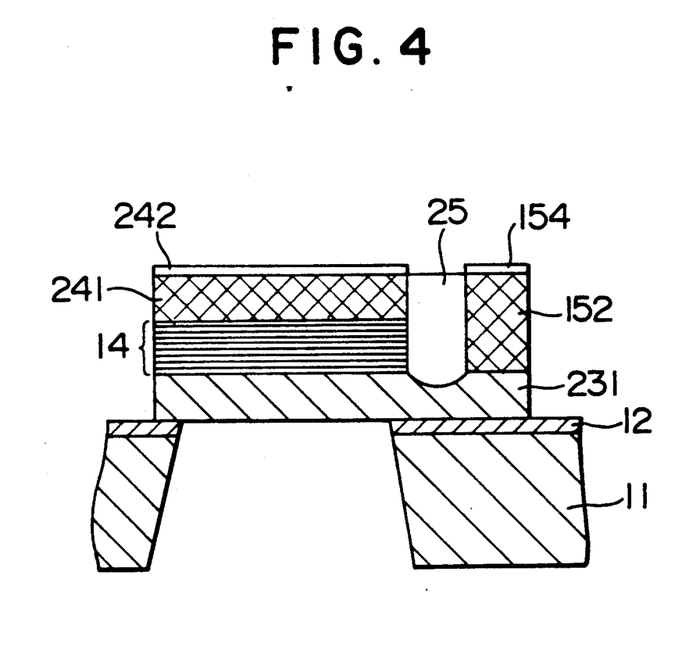
FIG. 4 is a schematic sectional view illustrating a device according to a second embodiment of the invention.

FIG. 4 illustrates a second embodiment of the invention. In the first embodiment previously described, the current injector (151 to 154) is so disposed as to cause current to be injected in substantially parallel relationship with the MQW structure. However, in the second embodiment, a current injector as represented by 152, 154, 231, 241 and 242 is so disposed as to ensure that current can be injected substantially vertically to the MQW structure. The device shown in FIG. 4 comprises an n+-type layer 231 of AlGaAs having a thickness of 321 nm and a p+-type layer 241 of AlGaAs having a thickness of 321 nm. The layers 231 and 241 are used as contacts for current injection. Be is implanted into the p+-type AlGaAs layer 241 to form a layer 152. A transparent electrode 242 is prepared by vapor deposition of Au and has a thickness of 150 Å. For electrically insulating the p+-type and n+-type layers, a region 25 is first formed by etching and subsequently $SiO_2$ is deposited into the region 25. The present embodiment can attain similar effects to those of the first embodiment.

Figure 5:
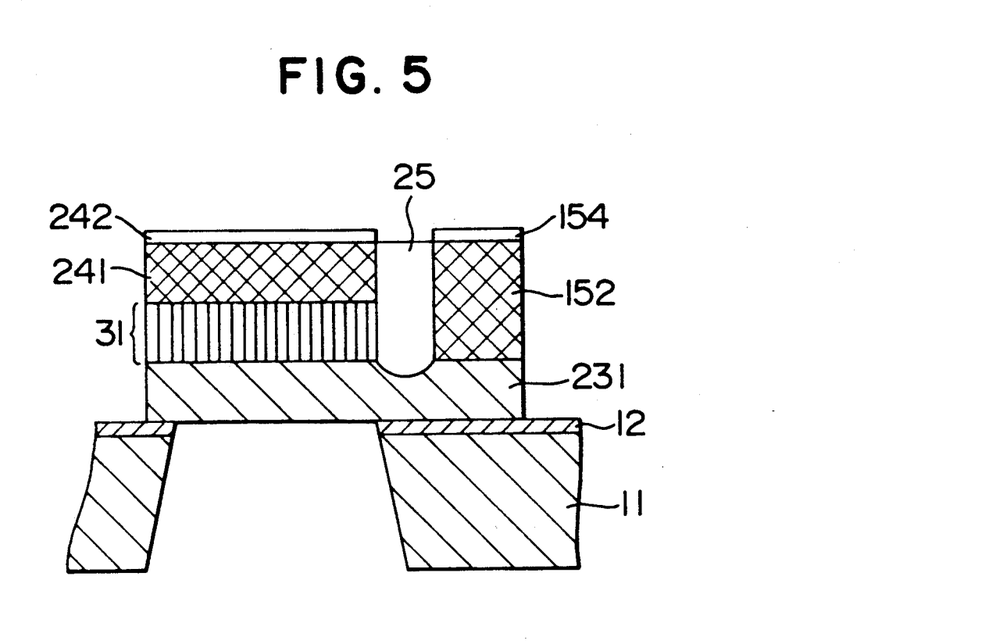
FIG. 5 is a schematic sectional view illustrating a device according to a third embodiment of the invention.

FIG. 5 illustrates a third embodiment of the invention wherein a MQW structure 31 corresponding to the MQW 14 of the second embodiment has an internal construction which is vertical. For formation of the MQW structure 31, an n+-type layer 231 of AlGaAs is first formed, a layer of GaAs is grown on the layer 231 to a thickness of 1.93 $\mu m$, the GaAs layer is etched to have wells of 100 nm width at intervals of 140 nm, and finally AlGaAs layers are grown in the wells. In this embodiment, the wavelength of light to be controlled is shifted to one of a longer value but a good on/off ratio can be obtained. The MQW structure 14 of the first embodiment may be modified to have a vertical internal construction in accordance with teachings of the third embodiment. Such a modification can attain effects similar to those of the third embodiment.

Figure 6:
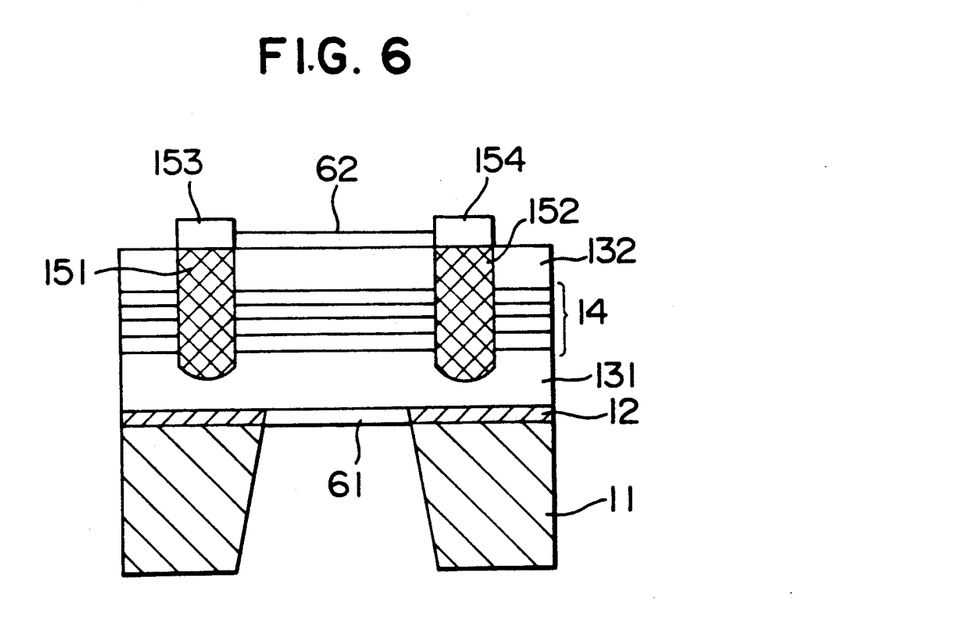
FIG. 6 is a schematic sectional view illustrating a device according to a fourth embodiment of the invention.
Figure 7:
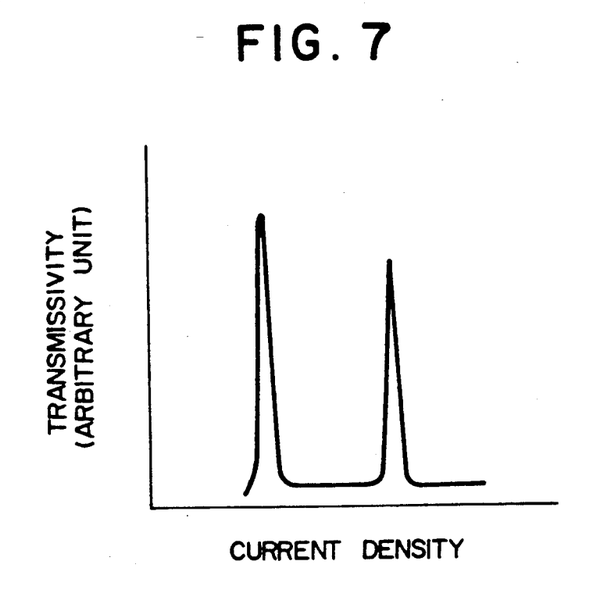
FIG. 7 is a graph showing a transmissivity characteristic of the FIG. 6 device.

FIG. 6 shows a fourth embodiment of the invention wherein the first embodiment is combined with a Fabry-Pérot resonator. Denoted by 61 and 62 are transparent mirrors which are respectively prepared by vapor depositing Au to 300 Å. The transmissivity of Fabry-Pérot resonator for incident light which is vertical to the mirror 62 is maximized when the optical path length between mirrors 61 and 62 is odd times the half wavelength of the incident light. The refractive index of the MQW structure, equivalent to the optical path length of the Fabry-Pérot resonator, can be changed by changing the amount of current injected into the MQW structure. FIG. 7 graphically illustrates a transmissivity characteristic of the Fabry-Pérot resonator used in the present embodiment, especially, dependency of the transmissivity on the amount of current injected into the MQW structure. It can be seen from FIG. 7 that the refractive index of the MQW structure changes with the current so that the transmission factor has maximums only at current values where the optical path length of the Fabry-Pérot resonator is odd times the half wavelength but is minimized at the other values of the current. Although the present embodiment has been described by referring to the combination of the first embodiment with the Fabry-Pérot resonator, the second and third embodiments may be combined with the Fabry-Pérot resonator to attain similar effects.

Figure 8:
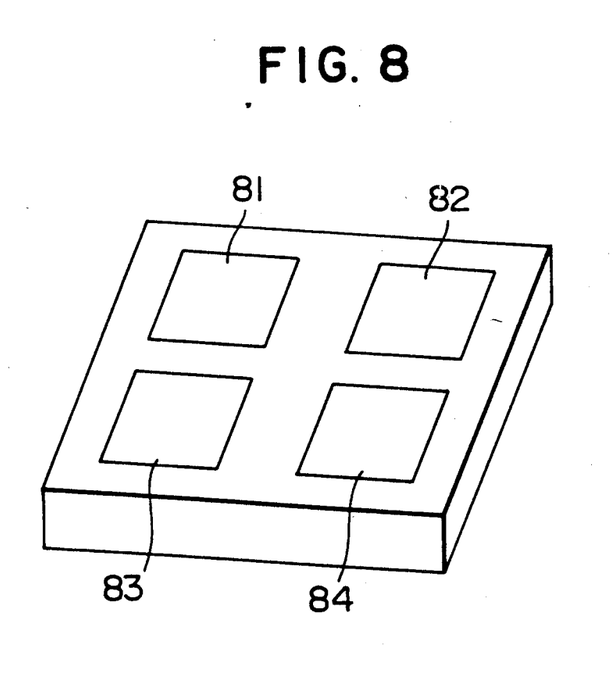
FIG. 8 is a schematic perspective view illustrating a fifth embodiment of the invention.

FIG. 8 illustrates a fifth embodiment of the invention wherein four current-controlled MQW devices are arranged in matrix. These devices can be formed on the same substrate and can be controlled independently. Respective devices 81 to 84 may be constructed in accordance with any one of the first to fourth embodiments described previously. Although the number of MQW devices illustrated therewith is four, a different number can be employed and which may also be greater.

In the foregoing embodiments, the current injector and MQW structure has a p+nn+-type structure, but the invention is not limited thereto and n+nn+, p+pp+, p+np+, p+pn+, n+pn+ and p+in+ type structures may be used without being restricted by the doping mode. Particularly, the MQW structure may preferably be subjected to doping from the standpoint of efficiency of current injection.

Further, it should be noted that the use of the AlGaAs/GaAs system is for purposes of example only rather than being limited thereto and other materials may be combined together for use in the present invention.

Figure 9:
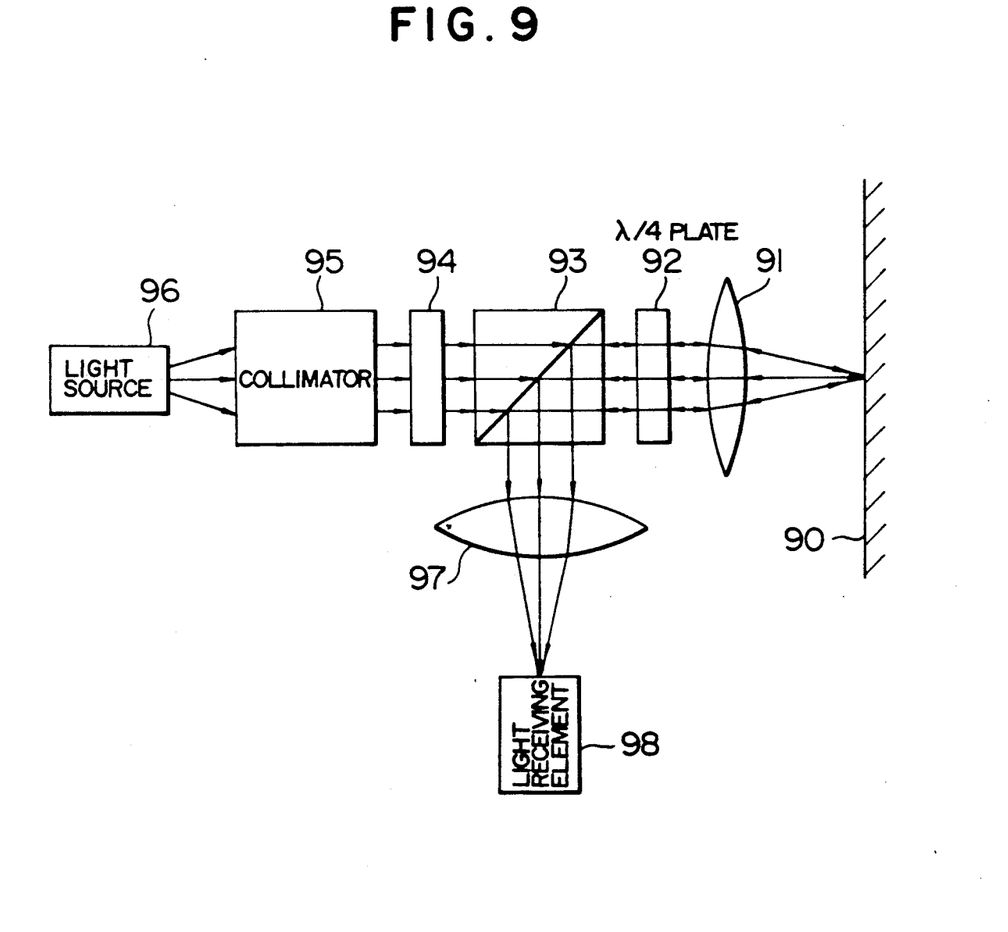
FIG. 9 is a schematic diagram illustrating an example of an application of the invention.

The present invention can be exemplified in connection with an optical disc apparatus schematically shown in FIG. 9. In this apparatus, recording and erasure of information is effected by changing the phase of a material of a disc.

Light emitted from a light source 96 such as a laser device is converted by a collimator 95 into a forward parallel beam and the forward parallel beam, maintained at predetermined intensity by means of an optical modulator 94, is passed through a polarization beam splitter 93 and a λ/4 plate 92 and focused on the surface of a disc 90 by means of a focusing lens 91. Light reflected from the rotating disc 90 is converted by the focusing lens 91 into a backward parallel beam and the backward parallel beam is passed through the λ/4 plate to assume a polarized state which is different from the polarized state of the forward parallel beam. Consequently, the backward parallel beam is 90° deflected by the polarization beam splitter so as to reach a light receiving element 98 through a focusing lens 97.

For example, 12 mW light intensity is required for recording information on the disc, 7 to 8 mW for erasing recorded information and 1 to 2 mW for reading information from the disc. Since light of 1 to 2 mW intensity obtained by directly controlling the light source 96 has a degraded S/N ratio, it would be preferable that output light derived from the light source which is maintained at a high power level be controlled so as to provide light of such a low power level of 1 to 2 mW. The optical modulator in accordance with the present invention has a small absorption loss during on-state for transmission of light and a high modulation ratio and hence can be suited for use as the optical modulator of the FIG. 9 apparatus. After modulation, the intensity of light can be obtained amounting to 12 mW for an injection current of 20 A/cm$^2$, 8 mW for an injection current of 15 A/cm$^2$ and 1 mW in the absence of current injection.

The invention has other applications than the above and for example, may also be applied to a modulator for small-scale optical communications such as LAN.

Since the optical modulator of this invention is not operated in inverse bias fashion, the question of leakage current need not be addressed which results in an advantage of such device and the device structure and fabrication process can be simplified.

It is to be noted that in the foregoing description, like parts are designated by like characters.

As described above, according to the invention, a low-loss semiconductor device for light control can be obtained wherein the modulation speed is relatively low but the on/off ratio for transmissivity can be high and the transmissivity during on-state can be large.

We claim:

1. A semiconductor device for control of light comprising:
    a lamination layer in which a plurality of semiconductor thin films having different compositions are laminated alternately, said lamination layer being characterized by a corresponding optical absorption and a corresponding refractive index;
    means for biasing said lamination layer in a forward direction so as to inject current to flow through said lamination layer so said corresponding optical absorption and said corresponding refractive index of said lamination layer may be changed by said injected current, said means including two semiconductor layers;
    wherein said lamination layer is interposed between said two semiconductor layers and is in contact with said two semiconductor layers thereby effecting a composite structure, said two semiconductor layers being made of a material having a band gap which is wider than that of said lamination layer; and
    wherein the material of said two semiconductor layers is such that a product of the corresponding thickness and corresponding refractive index is substantially equal to an odd multiple of ¼ of the wavelength of light to be controlled.

2. A light control semiconductor device according to claim 1, wherein the respective semiconductor thin films constituting said lamination layer have a thickness which causes exciton confinement effect to take plane and causes energy at the absorption peak of excitons to coincide with energy of light to be controlled, and said lamination layer is of a multi-quantum well (MQW) structure.

3. A light control semiconductor device according to claim 1, wherein said means for biasing said lamination layer includes one of said two semiconductor layers being a p-type doped semiconductor layer and the other of said two semiconductor layers being an n-type doped semiconductor layer and said lamination layer is interposed between said p-type doped and n-type doped semiconductor layers.

4. A light control semiconductor device according to claim 1, wherein said means for biasing said lamination layer includes said two semiconductor layers both being n-type doped semiconductor layers and said lamination layer is interposed between said two n-type doped semiconductor layers.

5. A light control semiconductor device according to claim 1, wherein said means for biasing said lamination layer includes said two semiconductor layers both being p-type doped semiconductor layers and said lamination layer is interposed between said two p-type doped semiconductor layers.

6. A light control semiconductor device according to claim 3, wherein said lamination layer is so doped as to be of n-type.

7. A light control semiconductor device according to claim 4, wherein said lamination layer is so doped as to be of n-type.

8. A light control semiconductor device according to claim 5, wherein said lamination layer is so doped as to be of n-type.

9. A light control semiconductor device according to claim 3, wherein said lamination layer is so doped as to be of p-type.

10. A light control semiconductor device according to claim 4, wherein said lamination layer is so doped as to be of p-type.

11. A light control semiconductor device according to claim 5, wherein said lamination layer is so doped as to be p-type.

12. A light control semiconductor device according to claim 1, wherein said means for biasing said lamination layer injects the current into said lamination layer in substantially parallel relationship therewith.

13. A light control semiconductor device according to claim 1 wherein said means for biasing said lamination layer injects the current into said lamination layer in substantially vertical relationship therewith.

14. A light control semiconductor device according to claim 1, further comprising: two mirrors for forming a Fabry-Pérot resonator, wherein said composite structure is interposed between said mirrors and optical absorption and optical path length between said mirrors change in response to the injection current.

15. An arrangement for control of light comprising a plurality of devices according to claim 1, wherein said devices are arranged in matrix.

16. An arrangement for control of light, comprising:
    a light source;

a semiconductor device for modulating incident light from said light source including:

a lamination layer composed of a plurality of semiconductor thin films having different compositions laminated alternately and said lamination layer is characterized by a corresponding optical absorption and a corresponding refractive index, means for biasing said lamination layer in a forward direction so as to inject current to flow through said lamination layer so said corresponding optical absorption and said corresponding refractive index of said lamination layer may be changed by said injected current, said means including two semiconductor layers, wherein said lamination layer is interposed between said two semiconductor layers and is in contact with said two semiconductor layers thereby effecting a composite structure, said two semiconductor layers being made of a material having a band gap which is wider than that of said lamination layer, and wherein the material of said two semiconductor layers is such that a product of the corresponding thickness and corresponding refractive index is substantially equal to an odd multiple of ¼ of the wavelength of light to be controlled; and an optical system for focusing the light from said light source as modulated by said semiconductor device.

17. An arrangement for control of light according to claim 16, wherein said composite structure is interposed between mirrors and said corresponding optical absorption and optical path length between said mirrors change in response to said injected current.

18. An arrangement for control of light according to claim 17, wherein said means for biasing said lamination layer includes one of said two semiconductor layers being a p-type doped semiconductor layer and the other of said two semiconductor layers being an n-type doped semiconductor layer and said lamination layer is interposed between said p-type doped and n-type doped semiconductor layers.

19. An arrangement for control of light according to claim 17, wherein said means for biasing said lamination layer includes said two semiconductor layers both being n-type doped semiconductor layers and said lamination layer is interposed between said two n-type doped semiconductor layers.

20. An arrangement for control of light according to claim 17, wherein said means for biasing said lamination layer includes said two semiconductor layers both being p-type doped semiconductor layers and said lamination layer is interposed between said two p-type doped semiconductor layers.

21. A semiconductor device for control of light comprising:

a lamination layer in which a plurality of semiconductor thin films having different compositions are laminated alternately, said lamination layer being characterized by a corresponding optical absorption and a corresponding refractive index;

means for biasing said lamination layer in the forward direction so as to inject current to flow through said lamination layer so said corresponding optical absorption and said corresponding refractive index of said lamination layer may be changed by said injected current, said means including two semiconductor layers; and wherein said lamination layer is interposed between said two semiconductor layers and is in contact with said two semiconductor layers thereby effecting a composite structure, said two semiconductor layers being made of a material having a band gap which is wider than that of said lamination layer.

22. A semiconductor device according to claim 21, wherein said means for biasing said lamination layer in the forward direction includes on/off control means, such that when current is injected to flow through the lamination layer transmission of the light is at a maximum and when current is not injected to flow through the lamination layer transmission of the light is at a minimum.

23. A semiconductor device according to claim 21, wherein the lamination layer includes excitons absorbing the light when current is not injected to flow through the lamination layer, the excitons disappearing when current is injected to flow through the lamination layer such that absorption of light in the lamination layer when the current is injected is at a minimum.

24. A semiconductor device according to claim 23, wherein said lamination layer is a multi-quantum well structure.

25. A semiconductor device for control of light comprising:

a lamination layer in which a plurality of semiconductor thin films having different compositions are laminated alternately, said lamination layer being characterized by a corresponding optical absorption and a corresponding refractive index;

means for injecting current to flow through said lamination layer so said corresponding optical absorption and said corresponding refractive index of said lamination layer are changed by said injected current, said means including two semiconductor layers, the means for injecting including on/off control means such that when current is injected to flow through the lamination layer transmission of the light is at a maximum and when current is not injected to flow through the lamination layer transmission of the light is at a minimum;

wherein said lamination layer is interposed between said two semiconductor layers and is in contact with said two semiconductor layers thereby effecting a composite structure, said two semiconductor layers being made of a material having a band gap which is wider than that of said lamination layer; and wherein the material of said two semiconductor layers is such that a product of the corresponding thickness and corresponding refractive index is substantially equal to an odd multiple of ¼ of the wavelength of light to be controlled.

26. A semiconductor device according to claim 25, wherein the lamination layer includes excitons absorbing the light when current is not injected to flow through the lamination layer, the excitons disappearing when current is injected to flow through the lamination layer such that absorption of light in the lamination layer when the current is injected is at a minimum.

27. A semiconductor device according to claim 26, wherein said lamination layer is a multi-quantum well structure.

28. An arrangement for control of light, comprising:
a light source;
a semiconductor device for modulating incident light from said light source, including:

a lamination layer composed of a plurality of semiconductor thin films having different compositions laminated alternately and said lamination layer is characterized by a corresponding optical absorption and a corresponding refractive index, and means for injecting current to flow through said lamination layer so said corresponding optical absorption and said corresponding refractive index of said lamination layer are changed by said injected current, said means including two semiconductor layers, the means for injecting including on/off control means such that when current is injected to flow through the lamination layer transmission of the light is at a maximum and when current is not injected to flow through the lamination layer transmission of the light is at a minimum, wherein said lamination layer is interposed between said two semiconductor layers and is in contact with said two semiconductor layers thereby effecting a composite structure, said two semiconductor layers being made of a material having a band gap which is wider than that of said lamination layer, and wherein the material of said two semiconductor layers is such that a product of the corresponding thickness and corresponding refractive index is substantially equal to an odd multiple of ¼ of the wavelength of light to be controlled; and an optical system for focusing the light from said light source as modulated by said semiconductor device.

29. An arrangement for control of light according to claim 28, wherein the lamination layer includes excitons absorbing the light when current is not injected to flow through the lamination layer, the excitons disappearing when current is injected to flow through the lamination layer such that absorption of light in the lamination layer when the current is injected is at a minimum.

30. An arrangement for control of light according to claim 29, wherein said lamination layer is a multi-quantum well structure.

31. A semiconductor device for control of light comprising:

a lamination layer in which a plurality of semiconductor thin films having different compositions are laminated alternately, said lamination layer being characterized by a corresponding optical absorption and a corresponding refractive index;

means for injecting current to flow through said lamination layer so said corresponding optical absorption and said corresponding refractive index of said lamination layer are changed by said injected current, said means including two semiconductor layers, the means for injecting including on/off control means such that when current is injected to flow through the lamination layer transmission of the light is at a maximum and when current is not injected to flow through the lamination layer transmission of the light is at a minimum; and wherein said lamination layer is interposed between said two semiconductor layers and is in contact with said two semiconductor layers thereby effecting a composite structure, said two semiconductor layers being made of a material having a band gap which is wider than that of said lamination layer.

32. A semiconductor device according to claim 31, wherein the lamination layer includes excitons absorbing the light when current is not injected to flow through the lamination layer, the excitons disappearing when current is injected to flow through the lamination layer such that absorption of light in the lamination layer when the current is injected is at a minimum.

33. A semiconductor device according to claim 32, wherein said lamination layer is a multi-quantum well structure.

* * * * *